US009363480B2

(12) United States Patent
Ramalho (10) Patent No.: US 9,363,480 B2
(45) Date of Patent: Jun. 7, 2016

(54) OBTAINING REPLAY OF AUDIO DURING A CONFERENCE SESSION

(71) Applicant: Cisco Technology, Inc., San Jose, CA (US)

(72) Inventor: Michael A. Ramalho, Lakewood Ranch, FL (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 14/464,038

(22) Filed: Aug. 20, 2014

(65) Prior Publication Data

US 2016/0057390 A1   Feb. 25, 2016

(51) Int. Cl.
*H04N 7/14* (2006.01)
*H04N 7/15* (2006.01)
*H04L 29/06* (2006.01)

(52) U.S. Cl.
CPC .............. *H04N 7/155* (2013.01); *H04L 65/602* (2013.01); *H04L 65/608* (2013.01)

(58) Field of Classification Search
CPC ....................................................... H04N 7/14
USPC .............. 379/93.21, 158, 202.01, 204.01, 68; 348/14.12
See application file for complete search history.

(56) References Cited

U.S. PATENT DOCUMENTS

| | | | |
|---|---|---|---|
| 6,298,129 B1 * | 10/2001 | Culver | H04M 3/42153 379/202.01 |
| 6,501,763 B1 | 12/2002 | Bhagavath et al. | |
| 7,590,230 B1 | 9/2009 | Surazski | |
| 8,121,277 B2 | 2/2012 | Baird | |
| 8,290,124 B2 * | 10/2012 | Mikan et al. | 379/68 |
| 8,588,077 B2 | 11/2013 | Oran | |
| 8,626,496 B2 | 1/2014 | Toebes | |
| 8,731,152 B2 * | 5/2014 | Lee | H04N 7/15 348/14.12 |
| 9,024,999 B2 * | 5/2015 | Takahashi | 348/14.08 |
| 2004/0207724 A1 | 10/2004 | Crouch et al. | |
| 2006/0176832 A1 * | 8/2006 | Miceli | H04L 1/0002 370/260 |
| 2008/0225735 A1 * | 9/2008 | Qiu | H04L 1/0009 370/252 |

(Continued)

FOREIGN PATENT DOCUMENTS

| | | |
|---|---|---|
| CA | 2507123 A1 | 6/2004 |
| WO | 03055140 A1 | 7/2003 |

OTHER PUBLICATIONS

Encounter.net, "Recording a Meeting", http://www.encounter.net/home/_downloads/userguides/Recording%20a%20Meeting.pdf, retrieved May 30, 2014, pp. 53-60.

(Continued)

*Primary Examiner* — Olisa Anwah
(74) *Attorney, Agent, or Firm* — Edell, Sharpiro & Finnan, LLC (57) ABSTRACT

Presented herein are techniques for receiving media at a participant device for a conference session. The media may be transmitted to the participant device using a first transport mechanism. A command is received from a user of a participant device in a conference session to playback a portion of the conference session. A request is sent to the conference server to retransmit a recording of the portion of the conference session requested for playback. Data is received for the recording of the portion of the conference session transmitted from the conference server using a second transport mechanism, wherein the second transport mechanism is a higher reliability transport mechanism than the first transport mechanism.

21 Claims, 10 Drawing Sheets

(56) References Cited

U.S. PATENT DOCUMENTS

| | | | |
|---|---|---|---|
| 2010/0177880 A1* | 7/2010 | Danielsen | H04L 67/2804 379/202.01 |
| 2011/0077755 A1* | 3/2011 | Yoakum | H04M 3/568 700/94 |
| 2013/0339431 A1* | 12/2013 | Yannakopoulos et al. | 709/204 |
| 2014/0192825 A1* | 7/2014 | Wang | H04L 49/55 370/475 |
| 2014/0362979 A1* | 12/2014 | Kaplan et al. | 379/67.1 |

OTHER PUBLICATIONS

Faalsa Labs, "HEARD", HEARD on the App Store on iTunes, https://itunes.apple.com/us/app/heard/id615420427?Is=1&mt=8, retrieved May 30, 2014, 3 pages.

* cited by examiner

OBTAINING REPLAY OF AUDIO DURING A CONFERENCE SESSION

TECHNICAL FIELD

The present disclosure relates to meeting/conference sessions.

BACKGROUND

Conference sessions provide a convenient way for participants in different geographical locations to communicate with one another. For example, using a conference service, a first participant in a first location and a second participant in a second location may communicate with one another using audio and/or video communication, as well as be able to share documents, allowing each participant to view the same content at the same time. Sometimes, a participant may not be able to understand a portion of the transmitted content during a conference session.

DESCRIPTION OF EXAMPLE EMBODIMENTS

Overview

Presented herein are techniques for receiving media at a participant device for a conference session. The media may be transmitted to the participant device using a first transport mechanism. A command is received from a user of the participant device in the conference session to play back a portion of the conference session. A request is sent to the conference server to retransmit a recording of the portion of the conference session requested for playback. Data is received for the recording of the portion of the conference session transmitted from the conference server using a second transport mechanism, wherein the second transport mechanism is a higher reliability transport mechanism than the first transport mechanism.

Example Embodiments

During an online conference session, a participant may not be able to understand a portion of transmitted media content (e.g., audio) of the conference session and may wish to replay a portion in order to see or listen to content that was previously occurring in the conference session. The term "media" is meant to include audio, video, as well as other content (documents, video clips, slides, etc.) that may be shared during a conference session. Various reasons may exist for replaying a missed portion including: loss of participant attention, divergence between a presenter's train of thought and a participant's train of thought (e.g., a presenter progressing in a different direction than expected by a participant), or poor audio transport (e.g., from the presenting device to the conference server or from the conference server to a participating device).

Presented herein are techniques for a playback option to enable a participant to listen to a recorded portion of the conference session. A higher-quality rendition of the conference session portion may be obtained, regardless of whether that portion was provided to the conference server under good or bad transport conditions (e.g., packet loss, corruption due to transport issues, etc.). In addition, recorded portions may be replayed for any reason at the discretion of the participant.

According to the techniques presented herein, a request is sent to a conference server to retransmit a recording of the portion of the conference session requested for playback. Data is received for the recording of the portion of the conference session transmitted from the conference server using a higher reliability transport mechanism than the original transport mechanism. These techniques are now more fully described with reference to FIGS. 1-10.

Figure 1:
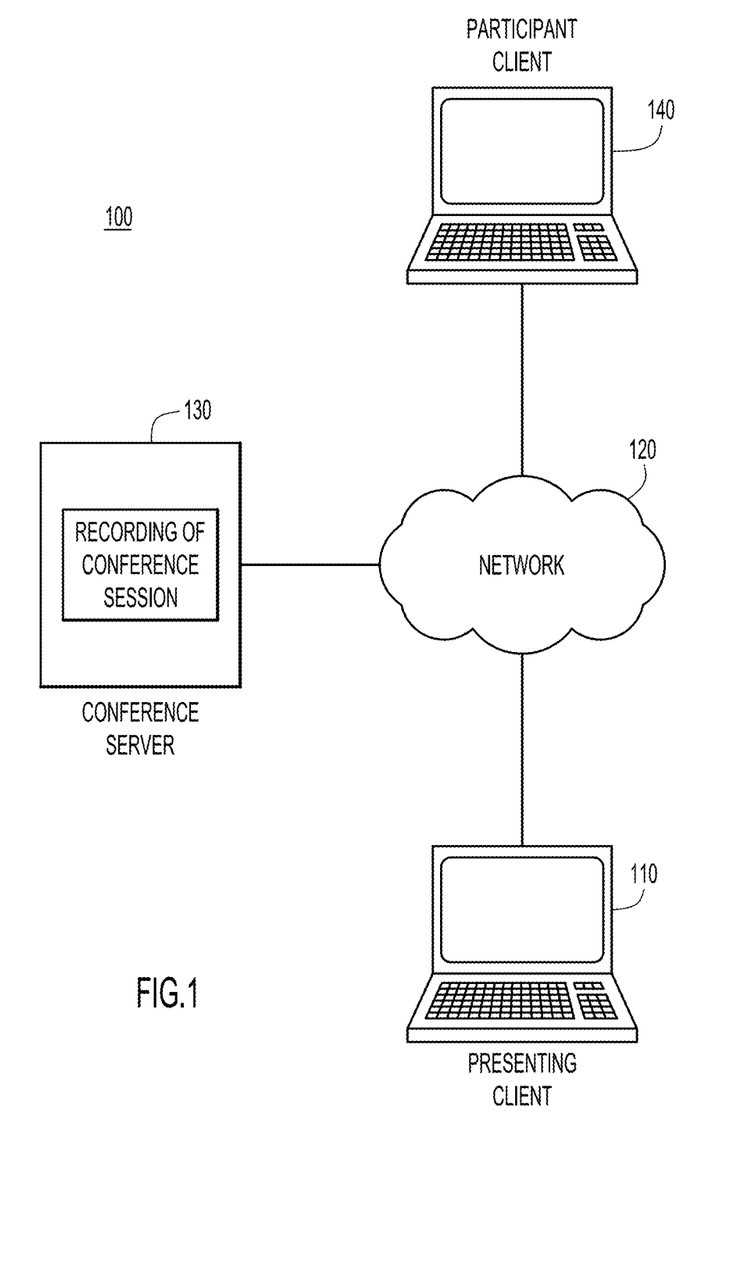
FIG. 1 is a block diagram of a system in which a conference session may be supported according to an example embodiment.

FIG. 1 is a block diagram of a conference system 100 including a presenting client 110, a network 120, a conference server 130 and a participant client 140. As disclosed herein, it is understood that the roles of presenting client 110 and participant client 140 may change over time. Presenting device 110 may communicate, via network 120, with conference server 130. Likewise, conference server 130 may communicate with participating client 140 via network 120. The presenting and participating devices may include a computer terminal, Smartphone, tablet computer, telephone and/or any other device capable of supporting a communication session, wherein the communication session may involve sending or receiving media communications (e.g., audio, video, and any content shared by the presenter to one or more participants). Conference server 130 is configured to host the communication session. Conference server 130, shown in FIG. 1 as a single server for simplicity, stores or obtains access to a recording stored by other equipment, of the conference session for each presenting client 110 and each participant client 140 of the communication session. While FIG. 1 shows only two clients, it is to be understood that this is only an example, and that in many situations, there are numerous clients participating in a conference session.

A presenting client 110 may send a request to conference server 130 over the network 120 to set up a communication session with participant client 140. Conference server 130 receives and accepts requests from the presenting client 110, or other device having sufficient administrative privileges, to schedule, and when the scheduled time occurs, to establish and maintain a conference session at a designated time.

Network 120 may include a local area network, wide area network (e.g., the Internet), wireless or hybrid network, that is capable of forwarding/routing messages between the presenting client 110, the conference server 130, and participant client 140. Additional features of the conference session are described in detail below.

During a conference session, the Real-time Transport Protocol (RTP) is normally utilized to convey real-time media (audio and video). RTP is an Internet protocol standard that specifies techniques for managing real-time transmission of multimedia data over either unicast or multicast network services and is commonly used in Internet telephony applications. RTP provides the ability to manage and monitor received data for large multicast networks. A receiving device can detect if there is any packet loss and compensate for other transmission issues such as delay jitter. Additionally, information in an RTP header can be used by a receiving device to reconstruct data and determine how codec bit streams are packetized. In general, RTP may run on top of a User Datagram Protocol (UDP), although it may use other transport protocols. Protocols such as UDP do not have built-in mechanisms for managing packet loss by requesting retransmission of media and/or audio content.

Additionally, RTP components may include: a sequence number used to detect packet loss, payload identification that describes specific media encodings, frame indications marking the beginning and end of each frame, source identification identifying the originator of the frame, and intramedia synchronization that utilizes timestamps to detect and compensate for delay jitter.

The techniques presented herein include obtaining audio for a previous portion of a conference session from a conference server via streaming technologies, such as the Transport Control Protocol (TCP), Adaptive Bitrate (ABR) Protocol, etc., which are examples of reliable transport mechanisms in that received transmissions may be monitored and if received transmissions are incomplete, requests may be sent for retransmission of the missing media content. Streaming technologies are usually not used for real-time interaction calls, due to the latency and associated overhead of monitoring received transmissions and requesting that media content be resent.

Accordingly, for a requested previous portion of a conference session, streaming corresponding media/audio session content from the conference server over a reliable transport mechanism, e.g., TCP, to a participant device will ameliorate the issue of bad transport, e.g., RTP packet loss, when that same content was being transmitted from the conference server to the participant device. If there is no packet loss, the recorded portion, sent by a RTP transport mechanism, and stored locally on the participant client device may be replayed to the participant at the participant client device.

The techniques presented herein may be used to ameliorate the issue of bad transport from the presenting client device to the conference server. In this case, a request may be sent from the conference server to the presenting device to resend media content (e.g., audio) from the missing 'X' seconds (due to packet loss) using a streaming technology or any other mechanism which involves a reliable transport mechanism. Thus, in the event that there was packet loss during the original transmission to the conference server, the conference server would then have a "known-good" copy of the audio after the presenting client resends the portion to the conference server.

The techniques presented herein may also be used to ameliorate or resolve poor audio quality at a participant device. In this case, a participant would request that a higher quality version, e.g., recording with a better codec, etc., of a portion of the conference be resent in order to hear the session content with better fidelity than was originally rendered to the participant device.

System 100 is not intended to be limiting with regard to the particular type of communication session shown. The techniques presented are applicable to a virtually unlimited number of servers as well as a multitude of network configurations and a plurality of participant clients and presenting clients. It is also understood that the roles of "presenting client 110" and "participating client 140" may change over time. For example, at a given time in a conference session with "N" participants, there may be one "presenter" and "N-1" "participants". In some embodiments, during a subsequent time in the conference session, the presenter may become a participant and a participant may become a presenter.

Additionally, in other embodiments, a conference server 130 may store recordings (e.g., an output mix) of a predetermined (e.g., three) number of recent presenters, wherein the recordings are available for playback to a participant. Continuing with this example, at a given time in a conference with "N" participants, there may be three (or up to three) presenting clients and "N-3" (or up to N-3) participating clients. Accordingly, when a participant client requests a portion of the recording for playback, the conference server may play the output mix back to the participant client using a higher reliability mechanism, or may request a higher-fidelity snippet from each of the presenting clients in the output mix (e.g., in this case, three) during the requested period of time.

Figure 2:
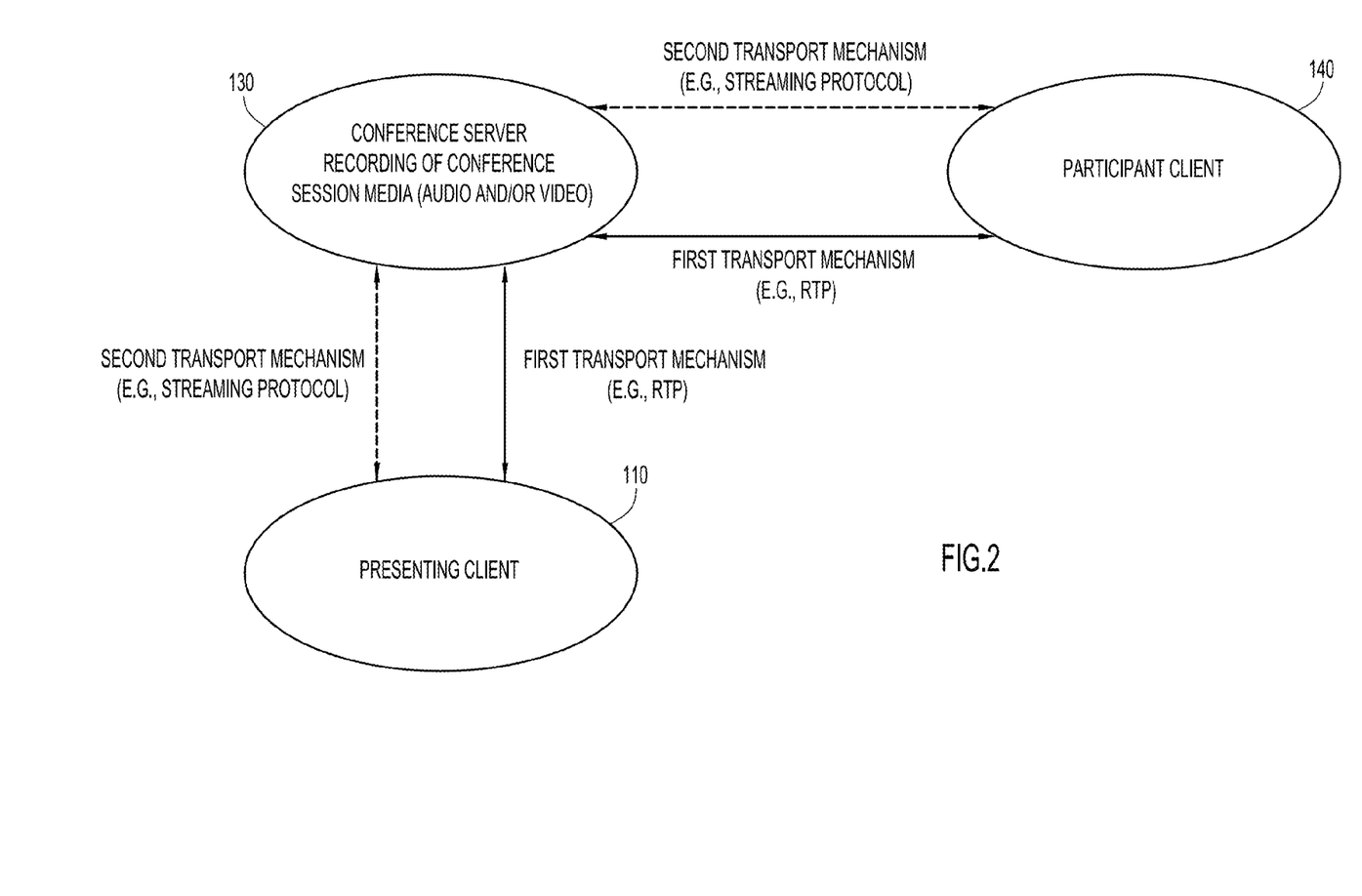
FIG. 2 is an illustration of transport mechanisms between a conference server and client devices, according to an example embodiment.

Reference is now made to FIG. 2. Presenting client 110 may send media communications over network 120 to conference server 130, wherein the communications are sent using a first transport mechanism, e.g., RTP. The conference server may store a recording of the conference session media and/or audio, and also may send the media to participant client 140, also using a first transport mechanism. In the event that the conference server 130 determines that packet loss or degradation occurred during transmission, the conference server 130 may send a request to the presenting client 110 to resend a portion of the media communication. The presenting client may retransmit the media portion using a second transport mechanism, such as using a streaming protocol, which has higher reliability than first transport mechanisms.

Similarly, conference server 130 may send media over network 120 to participant client 140 using a first transport mechanism, e.g., RTP. The participant client 140 may store a local recording of the conference session media. In the event that a participant client 140 requests playback and determines that packet loss or degradation has occurred during transmission, the participant client 140 may send a request to the conference server 130 to resend the corresponding portion of media communication. The conference server retransmits the media using a second transport mechanism, which has higher reliability than the first transport mechanism.

Figure 3:
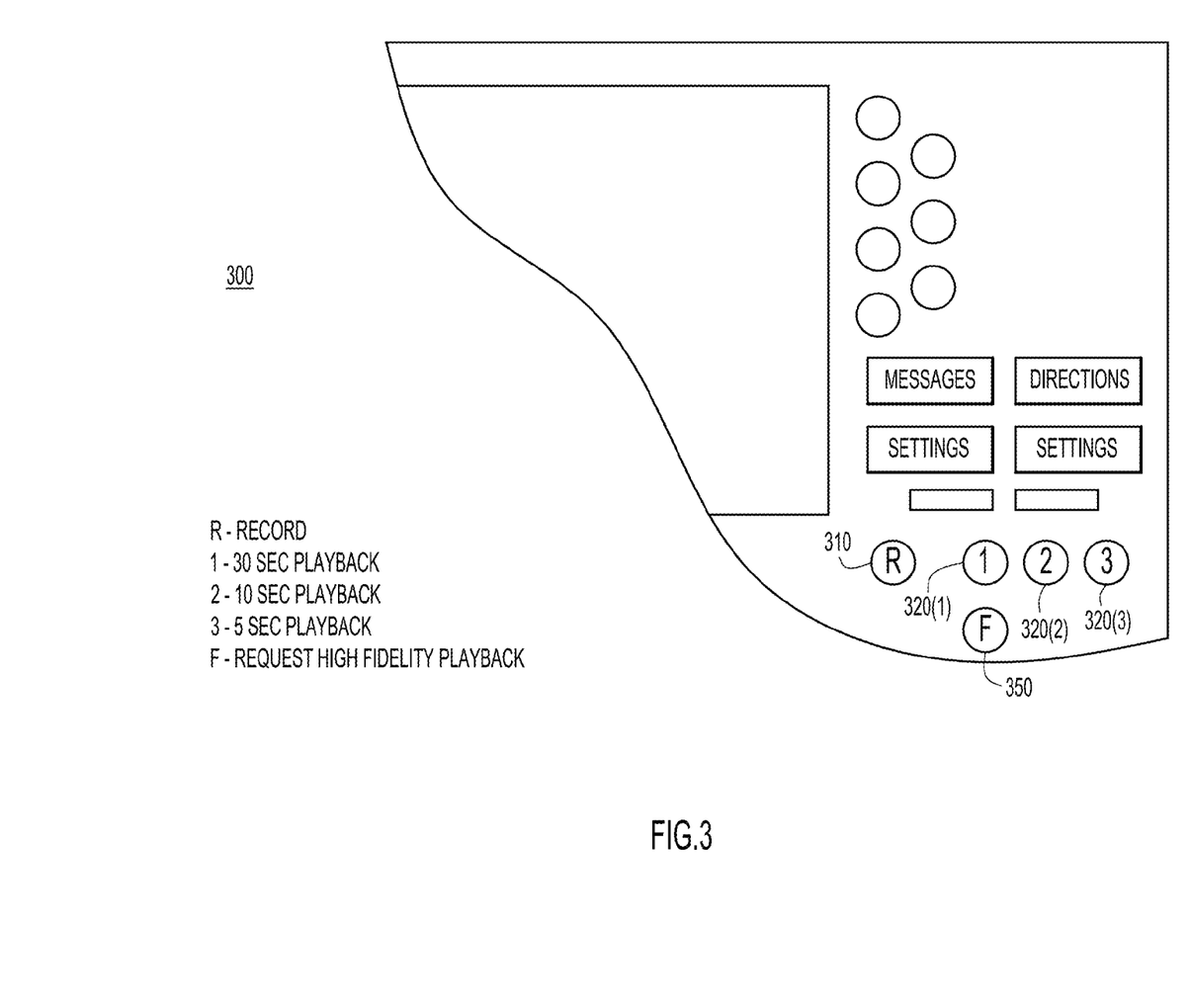
FIG. 3 is an illustration of a user interface displaying playback options, according to an example embodiment.

FIG. 3 shows a graphical user interface (GUI) screen 300 of a participant device, as an example embodiment. The GUI 300 includes a record button 310, several playback request buttons 320(1)-320(3), and a high fidelity playback request button 350. Record button 310 allows a user to record the conference according to the techniques presented herein. Any of the playback request buttons 320(1)-320(3) may be selected to request playback of a recorded (previous) portion of the conference, according to a predetermined time interval. For example, playback request button 320(1) may be designated for requesting playback of the most recent 30 seconds of audio of the conference session, playback request button 320(2) may be designated for requesting playback of the most recent 10 seconds of audio of the conference session, and playback request button 320(3) may be designated for requesting playback of the most recent 5 seconds of audio of the conference session. It is understood that any desired time interval may be selected and that these time intervals are only examples. Likewise, it is also understood that depending on the user interface capabilities of the endpoint, user interface options other than the buttons depicted here, such as progress sliders employed on video playback, may be used as well. Upon selecting a playback request button, media (e.g., audio) will be replayed beginning 'X' seconds prior to the current time. Playback request button 350 is used if a participant user desires to play back a higher fidelity recording/version of audio for a preset period of time, or for a user selected period of time.

As described hereinafter, if the playback request button 350 is selected requesting a higher fidelity or higher quality rendition of the portion of the conference session, this request is received by the conference server and directed to the presenting client to obtain a higher quality encoding of the original audio, e.g., encoded with a higher quality codec or using a native pulse-code modulation (PCM) format. Obtaining a higher-quality version of the portion of the conference may increase the intelligibility of the desired portion of the conference session. Multiple transcodes may tend to degrade low energy and short-term phonemic audio content. The higher quality rendition of the audio may be transmitted via a streaming or other high reliability transmission protocol mechanism.

When the media (e.g., audio) from the last 'X' seconds is replayed at a participant client, initial silence at the front end, back end or during the recorded portion may be skipped or compressed. Additionally, the portion of the conference may be replayed either at normal speed or an accelerated speed, e.g., an optional 30% increase in speed, until such time as replayed audio catches up with current audio for the conference session.

The techniques presented herein are not limited to the physical embodiments presented herein, and include any mechanism to initiate recording and select various playback options, e.g., through configuration of dropdown menus or icons of graphical user interfaces, selection of buttons, commands entered via command lines, voice commands, progress sliders, etc.

Figure 4:
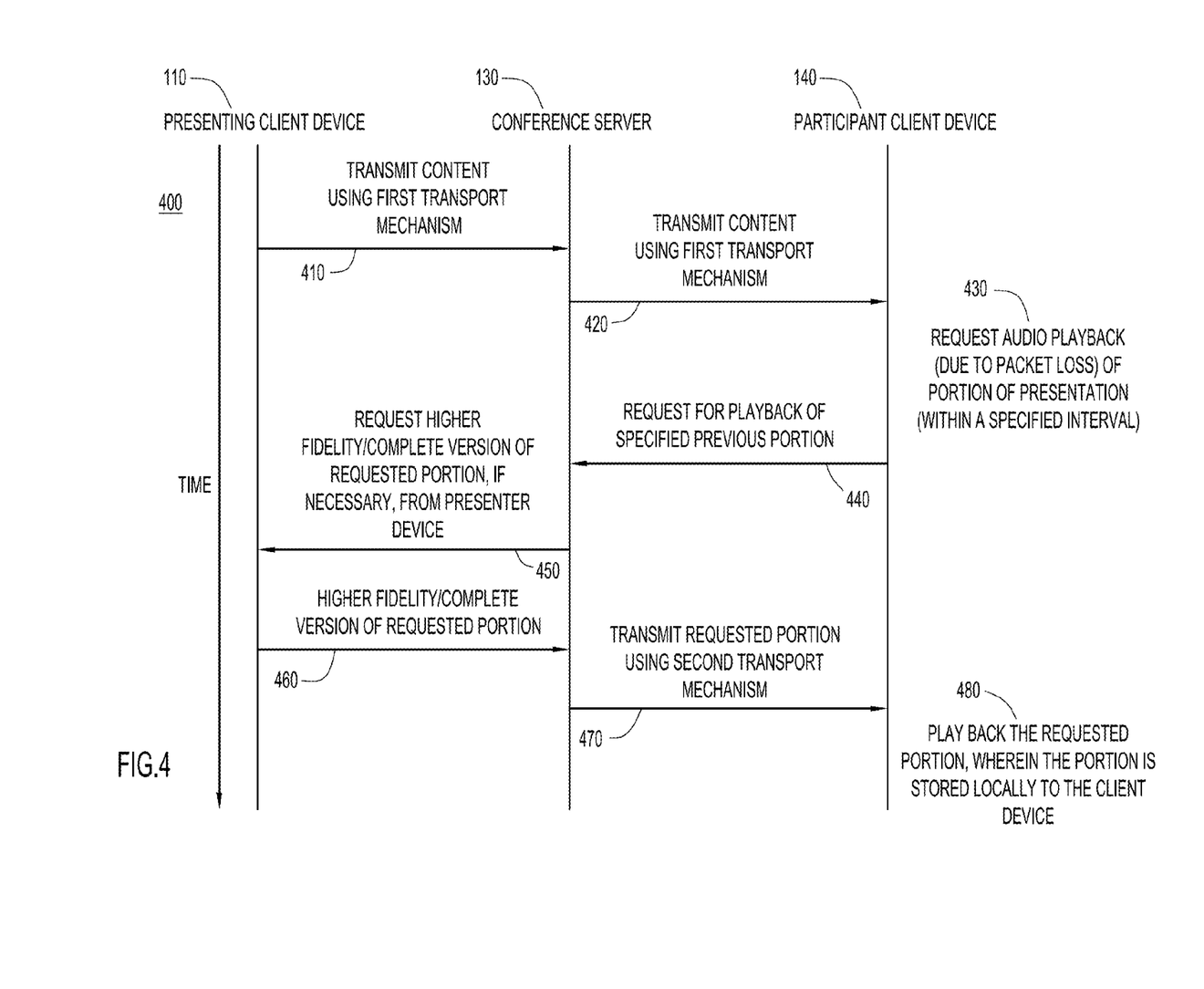
FIG. 4 illustrates a ladder sequence diagram, depicting operations for obtaining higher quality portions of media content according to an example embodiment.

FIG. 4 shows a ladder sequence diagram depicting the operational flow according to an example embodiment. At 410, conference content is transmitted from a presenting client device 110 to a conference server 130 using a first transport mechanism. The transport mechanism may be any protocol suitable for real-time communications, e.g., RTP. At 420, the conference server 130 may transmit content, also using a first transport mechanism, received from the presenting device 110 to a participant client device 140. The conference server 130 may also maintain a local recording of the media content received from the presenting device 110 and the participant client device 140 may also store/buffer a local recording of the media. At 430, a participant requests playback of a portion of the conference session. In the event that no packet loss occurred, the participant client device 140 may simply play back the participant client device's locally stored portion of the conference session. In this case, since there was no packet loss, the locally recorded version should provide sufficient clarity for playback. On the other hand, if packet loss was determined to have occurred or if the participant wishes to request a higher fidelity version of the conference portion, the locally recorded version of the conference portion may be incomplete or insufficient. In this case, at 440, a request for playback is sent to conference server 130 for retransmission of a specified portion (time interval) of the conference session, e.g., using one of the playback request buttons shown in FIG. 3. At 450, the conference server 130 determines whether or not it has a complete recording, e.g., whether there has been packet loss, and if a higher fidelity recording is needed for the requested portion of the conference. If packet loss has occurred in the recording at the conference server 130, a packet-loss free (i.e., complete) version of the requested portion of the conference session may be requested by the conference server 130 from the presenting device. It is noted that in some approaches, as soon as the conference server 130 receives a transmission from the presenting client device, the conference server may determine whether packet loss has occurred, and may request a packet-loss free version from the presenting client. In such cases, the conference server 130 does not have to receive a playback request from the participant client device 140 in order to request the complete version. If a high fidelity recording is requested by the participant client device 140, then the conference server 130 may also request the higher fidelity version from the presenting client device 110, if not otherwise available at the conference server 130. At 460, the presenting client device 110 sends the requested portion of the conference session to the conference server 130. In this case, the presenting client device 110 retransmits the requested content using a second transport mechanism that has higher reliability than the first transport mechanism. For example, the session content may be retransmitted using a streaming protocol. At 470, the conference server 130 retransmits the received portion from the presenting client device 110 to the participant client device 140. In the event that the conference server 130 already has a packet-loss free version of the requested portion, the conference server 130 need not request it from the presenting client device 110, and can therefore proceed to retransmitting that portion to the participant client device 140 at step 470 without the need for the operations of steps 450 and 460. This may be the case when, for example, the degradation at the participant client device 140 is due to the transmission of the content at step 420 using the first transport mechanism. At 480, the participant client device 140 receives the complete and/or higher fidelity portion of the conference session, free from packet loss, stores the received recording locally, and plays back that requested portion to the participant user at the participant client device 140.

Figure 5:
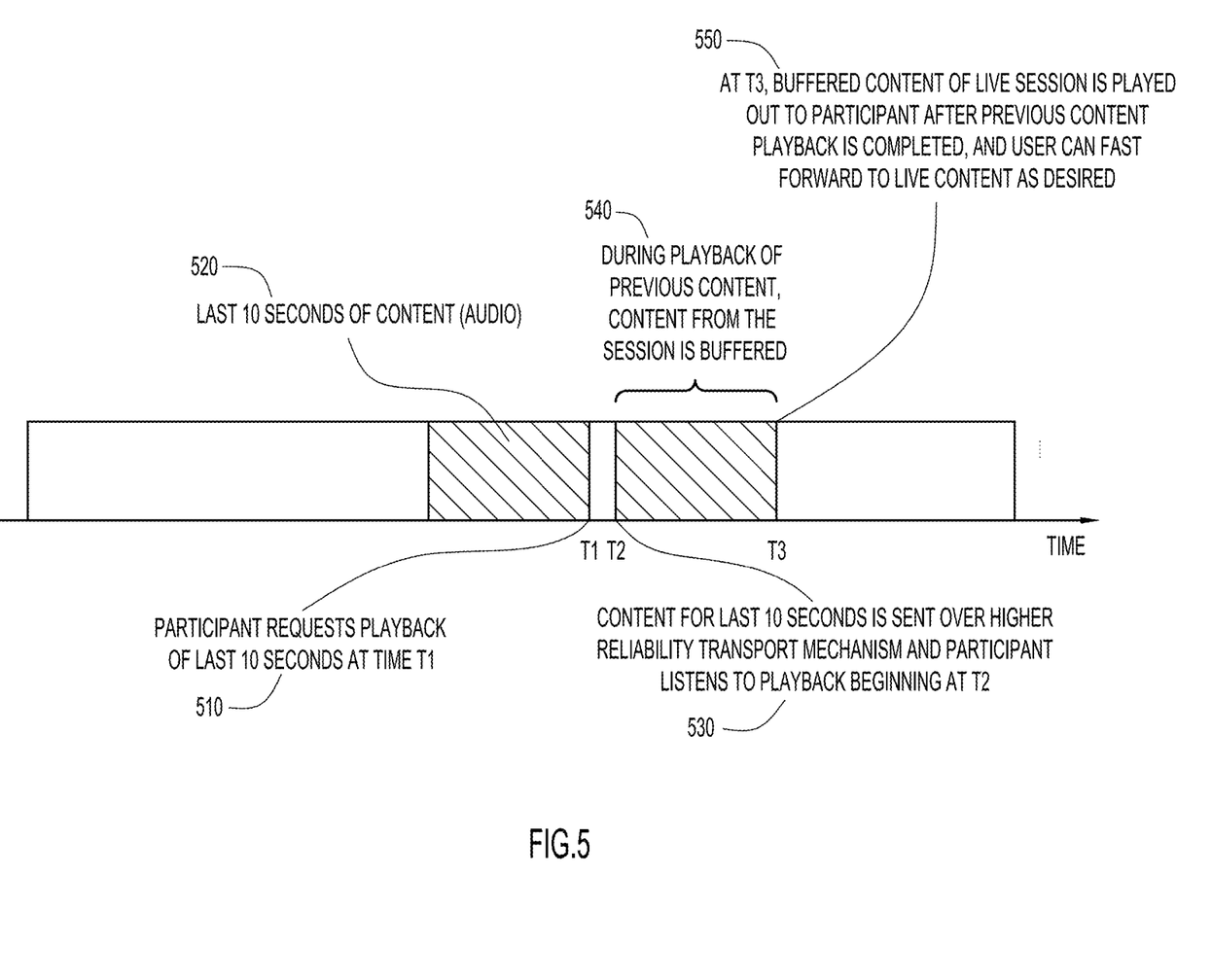
FIG. 5 illustrates a timeline of events for obtaining a portion of requested media content and playing back the received media content according to an example embodiment.

FIG. 5 illustrates a time-based representation for the playback functionality described herein. At 510, a participant requests at time T1 that the last 10 seconds of the conference session be played back. The last 10 seconds of content is shown at reference numeral 520. It is understood that any time segment may be specified, e.g., 30 seconds, 10 seconds, 5 seconds, etc. At 530, session content for the last 10 seconds is sent from a conference server to the participating client device, over a higher reliability transport mechanism and the participant listens to playback of the requested portion beginning at time T2. At 540, while the recorded content is being played back, content from the current ongoing session is being buffered. At 550, playback of the requested portion of the conference completes at time T3. In order to 'catch up' to the live content being presented as part of the ongoing conference session, the playback of requested content from time T2 to time T3 may be accelerated and portions of this content that involve silence, for example, may be skipped in order to accelerate and catch up to the live conference session.

Figure 6:
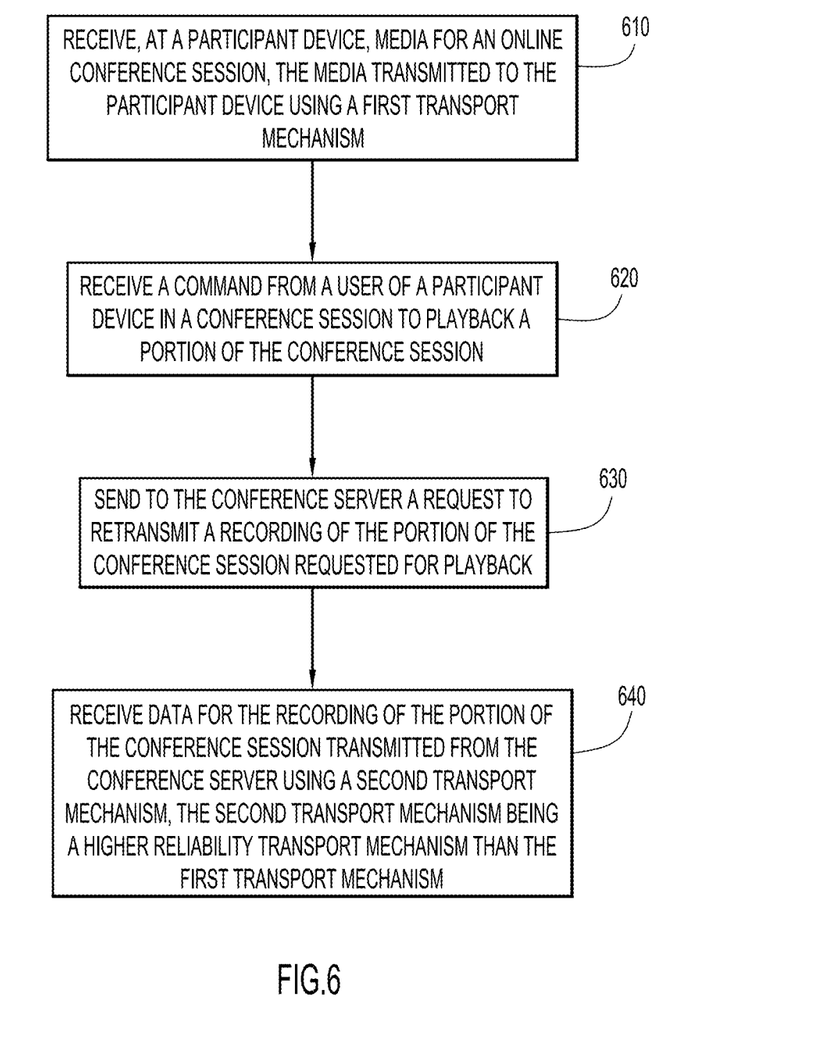
FIG. 6 is a flowchart generally depicting operations of a participant device according to an example embodiment.

FIG. 6 shows a high-level/generalized flowchart of operations performed by participant client device 140 according to the techniques described herein. At 610, media for an online conference session is received at a participant device, the media transmitted to the participant device using a first transport mechanism. At 620, a command is received from a user of a participant device in a conference session to playback a portion of the conference session. At 630, a request is sent to the conference server to retransmit a recording of the portion of the conference session requested for playback. At 640, data is received for the recording of the portion of the conference session transmitted from the conference server using a second transport mechanism, the second transport mechanism being a higher reliability transport mechanism than the first transport mechanism.

Figure 7:
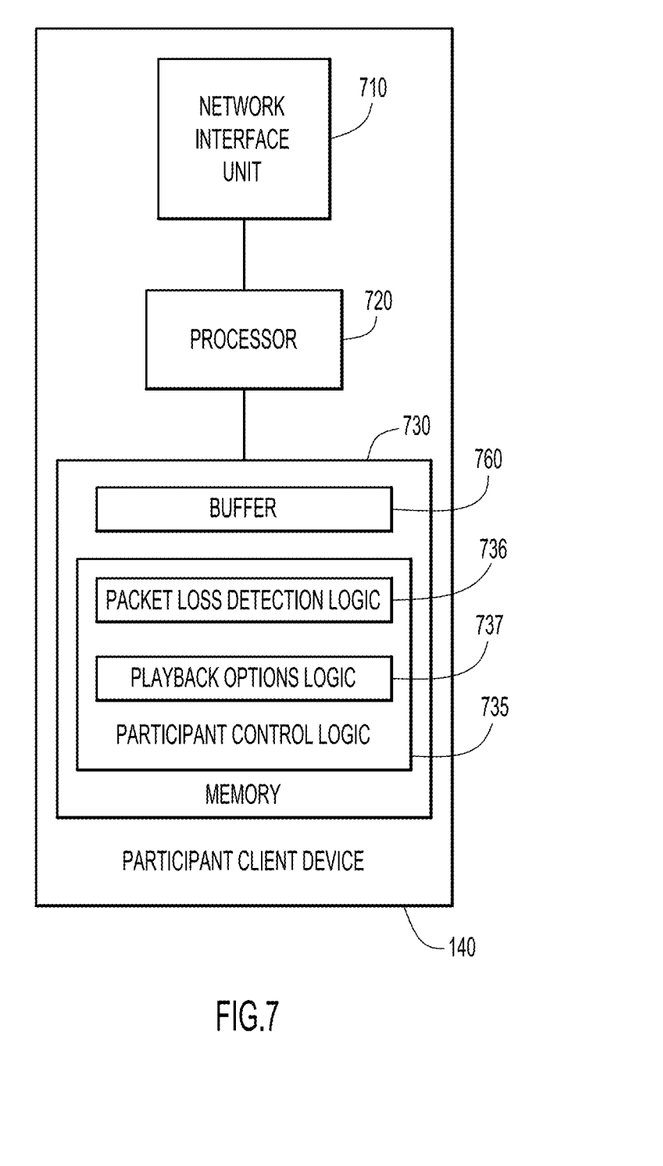
FIG. 7 is an example block diagram of a participating client device that receives and plays back media content according to an example embodiment.

FIG. 7 illustrates an example block diagram of a participant client device 140, configured to perform the techniques presented herein. The participant client device 140 includes a network interface unit 710, a processor 720, and a memory 730. The network interface unit 710 is configured to enable network communications over a network to receive data (media, shared document data, etc.) sent from a presenting client in a conference session via a conference server. The network interface unit 710 also sends requests for playback, the requests determined/generated by participant control logic 735. Participant control logic 735 includes packet loss detection logic 736 and playback options logic 737. Packet loss detection logic 736 detects when a transmission received from a conference server is incomplete, e.g., by detecting lost packets via missing sequence numbers from a series of received packets. Playback options logic 737 determines whether a high fidelity request is being sent as well as the designated time frame 'X' for playback, based on a selection made by a user participant. Buffer 760 may store a recording of the conference session content sent from the conference server (replayed content). Additionally, buffer 760 may also store outgoing conference session content while playback of a previous portion of a conference is occurring.

The processor 720 may be embodied by one or more microprocessors or microcontrollers, and executes software instructions stored in memory 730 for participant control logic 735 to perform the operations described above in connection with FIGS. 1-6.

Memory 730 may be embodied by one or more computer readable storage media that may comprise read only memory (ROM), random access memory (RAM), magnetic disk storage media devices, optical storage media devices, flash memory devices, electrical, optical, or other physical/tangible memory storage devices.

Thus, in general, the memory 730 may comprise one or more tangible (e.g., non-transitory) computer readable storage media (e.g., a memory device) encoded with software comprising computer executable instructions, and when the software is executed by the processor 720, the processor 720 is operable to perform the operations described herein in connection with participant control logic 735.

The functions of the processor 720 may be implemented by logic encoded in one or more tangible computer readable storage media or devices (e.g., storage devices compact discs, digital video discs, flash memory drives, etc. and embedded logic such as an ASIC, digital signal processor instructions, software that is executed by a processor, etc.).

Figure 8:
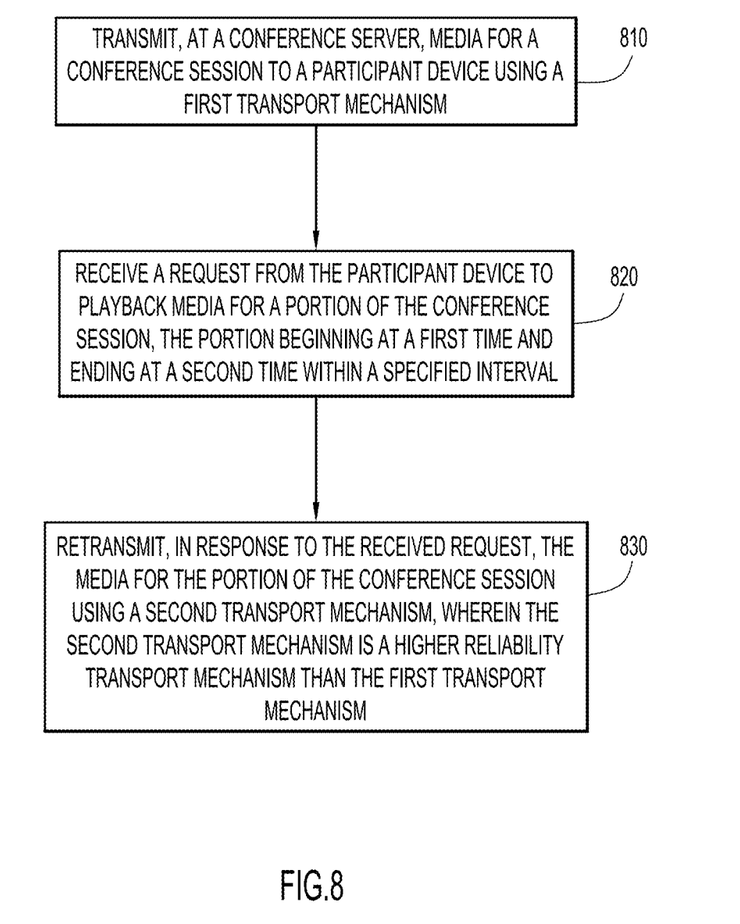
FIG. 8 is an example flow chart generally depicting operations of a conference server according to an example embodiment.

FIG. 8 shows a high-level/generalized flowchart of operations performed by conference server 130 according to the techniques described herein. At 810, media for a conference session is transmitted to a participant device using a first transport mechanism. At 820, a request is received from the participant device to playback media for a portion of the conference session, the portion beginning at a first time and ending at a second time within a specified interval. At 830, in response to the received request, the media for the portion of the conference session is retransmitted using a second transport mechanism, wherein the second transport mechanism is a higher reliability transport mechanism than the first transport mechanism.

Figure 9:
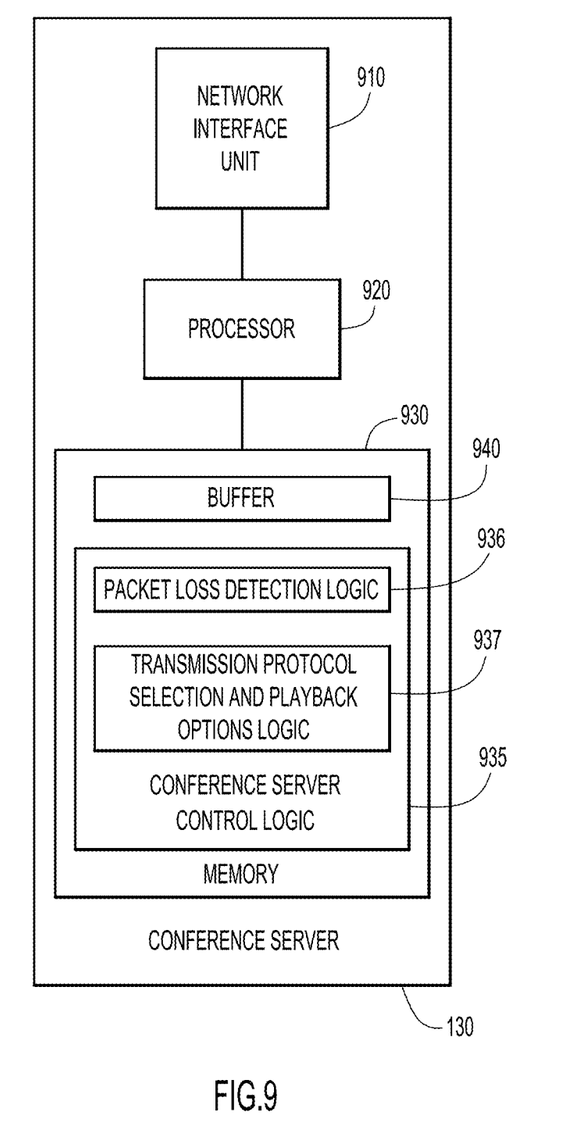
FIG. 9 is an example block diagram of a conference server according to an example embodiment.

FIG. 9 illustrates an example block diagram of an apparatus, conference server 130, configured to perform the techniques presented herein. The conference server 130 includes a network interface unit 910, a processor 920, and a memory 930. The network interface unit 910 is configured to enable network communications over a network to receive data (media, shared document data, etc.) sent from presenting client 110 in a conference session and to transmit such data to a participant client 140. The network interface unit 910 also sends requests for a higher fidelity version of a portion of media to presenting client 110, the requests determined by conference server control logic 935. Conference server control logic 935 comprises packet loss detection logic 936, and transmission protocol selection logic and playback options logic 937. Packet loss detection logic 936 detects when a transmission from a presenting client device is incomplete, e.g., by identifying missing sequence numbers in a sequence of received packets. Transmission protocol selection and playback options logic 937 determines which transmission protocol (e.g., a real-time protocol or a streaming protocol) should be selected when sending or resending media, whether a high fidelity version should be provided, as well as the length of time of the requested portion. Buffer 940 may store a recording of the entire conference session content sent from the presenting client device and/or a portion of the conference session, from which playback of a portion of the conference session can be made.

The processor 920 may be embodied by one or more microprocessors or microcontrollers, and executes software instructions stored in memory 930 to perform the conference server operations described above in connection with FIGS. 1-5, and 8.

Memory 930 may be embodied by one or more computer readable storage media that may comprise read only memory (ROM), random access memory (RAM), magnetic disk storage media devices, optical storage media devices, flash memory devices, electrical, optical, or other physical/tangible memory storage devices.

Thus, in general, the memory 930 may comprise one or more tangible (e.g., non-transitory) computer readable storage media (e.g., a memory device) encoded with software comprising computer executable instructions, and when the software is executed by the processor 920, the processor 920 is operable to perform the operations described herein in connection with conference server control logic 935.

The functions of the processor 920 may be implemented by logic encoded in one or more tangible computer readable storage media or devices (e.g., storage devices compact discs, digital video discs, flash memory drives, etc. and embedded logic such as an ASIC, digital signal processor instructions, software that is executed by a processor, etc.).

While FIG. 9 shows that the conference server 130 may be embodied as a dedicated physical device, it should be understand that the functions of the conference server 130 may be embodied as software running in a data center/cloud computing system, together with numerous other software applications. In other embodiments, such as distributed (i.e. decomposed) conference servers, two or more conference servers may be configured to operate as one functional entity. Accordingly, the conference server 130 of FIG. 9 may be interpreted as a single functional entity even if, in practice, it is composed of multiple smaller conference servers.

Figure 10:
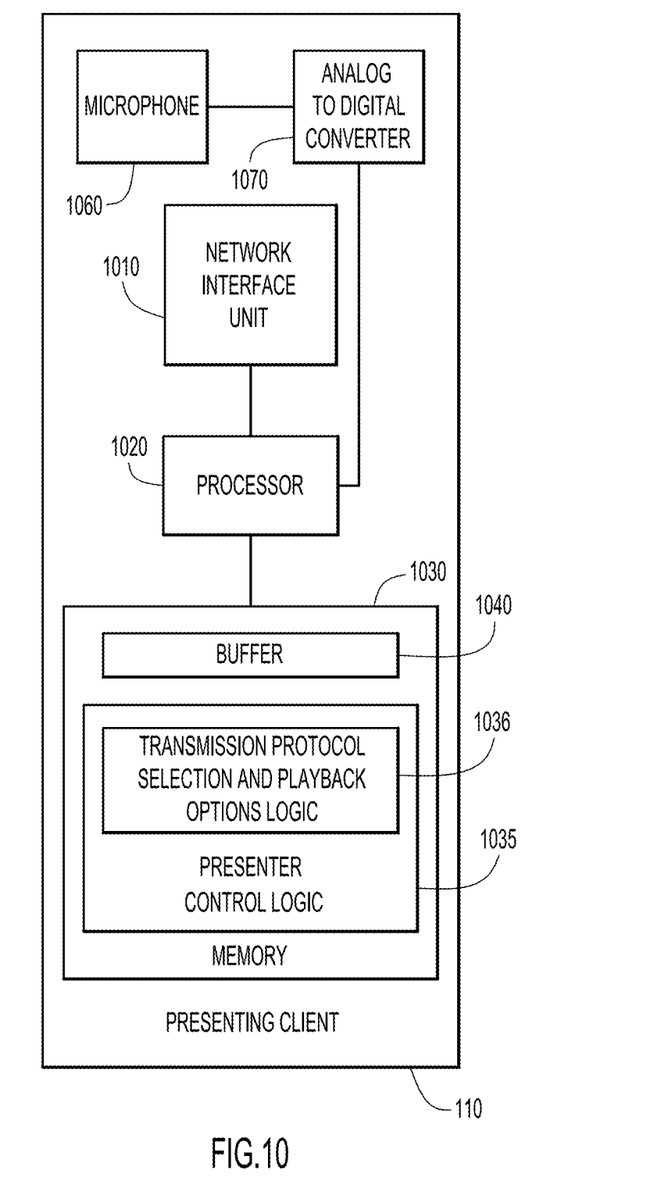
FIG. 10 is an example block diagram of a presenting client device that transmits media to a conference server according to an example embodiment.

FIG. 10 illustrates an example block diagram of a presenting client device 110 configured to perform the techniques presented herein. The presenting client 110 includes a network interface unit 1010, a processor 1020, and a memory 1030. The network interface unit 1010 is configured to enable network communications over a network to send data (audio, video, shared document data, etc.) from presenting client 110 to a conference server 130. Presenter control logic 1035 includes transport protocol selection and playback options logic 1036. Transport protocol selection logic and playback options logic 1036 determines when to transmit conference content using either a real-time protocol, e.g., RTP or a streaming protocol, the length of a requested conference portion, and whether a high fidelity version is to be provided. During a conference session when the presenting client device 110 is presented content (e.g., live broadcast), the presenting client device 110 will send media content using RTP, for example. If the presenting client device 110 receives a request from a conference server to retransmit a portion of the conference session, the portion of the conference will be retransmitted using a streaming protocol. Buffer 1040 may also contain a recording of the conference session content sent from the presenting client device 110 to the conference server 130.

Microphone 1060 receives audio input from a presenter, and analog to digital converter 1070 converts the detected audio signal into a digitized signal that may be received and stored electronically.

The processor 1020 may be embodied by one or more microprocessors or microcontrollers, and executes software instructions stored in memory 1030 for presenter control logic 1035 to perform the operations described above in connection with FIGS. 1-5.

Memory 1030 may be embodied by one or more computer readable storage media that may comprise read only memory (ROM), random access memory (RAM), magnetic disk storage media devices, optical storage media devices, flash memory devices, electrical, optical, or other physical/tangible memory storage devices.

Thus, in general, the memory 1030 may comprise one or more tangible (e.g., non-transitory) computer readable storage media (e.g., a memory device) encoded with software comprising computer executable instructions, and when the software is executed by the processor 1020, the processor 1020 is operable to perform the operations described herein in connection with presenter control logic 1035.

The functions of the processor 1020 may be implemented by logic encoded in one or more tangible computer readable storage media or devices (e.g., storage devices compact discs, digital video discs, flash memory drives, etc. and embedded logic such as an ASIC, digital signal processor instructions, software that is executed by a processor, etc.).

Advantages of the present techniques include not requiring a presenter to restate previously presented content, due to: lack of attention from a participant, a different train of thought between a participant and a presenter, transport issues between a conference server and a participant, transport issues between a presenting client and a conference server, or language difficulties or other intelligibility issues that may be overcome by listening to the portion of the conference a second time. Higher fidelity portions of the conference session may also be requested according to the techniques presented herein.

Optionally, the conference server may repair audio dropout in any recording of the conference, as it is being made. Even if there were transmission issues during the live conference, a participant could listen to a complete recording of the conference that was corrected to remove defects (e.g., packet loss, fidelity, etc.).

The techniques presented herein may apply to any resources that are commonly shared, and are not limited to the specific examples disclosed herein.

The techniques presented herein provide a method, apparatus and computer readable media of obtaining, for receiving media at a participant device for a conference session, the media transmitted to the participant device using a first transport mechanism; receiving a command from a user of a participant device in a conference session to playback a portion of the conference session; sending to the conference server a request to retransmit a recording of the portion of the conference session requested for playback; receiving data for the recording of the portion of the conference session transmitted from the conference server using a second transport mechanism, the second transport mechanism being a higher reliability transport mechanism than the first transport mechanism.

The techniques presented herein also provide a method, apparatus and computer readable media of transmitting media at a conference server for a conference session to a participant device using a first transport mechanism; receiving a request from the participant device to playback media for a portion of the conference session, the portion beginning at a first time and ending at a second time within a specified interval; and in response to the received request, retransmitting the media for the portion of the conference session using a second transport mechanism, wherein the second transport mechanism is a higher reliability transport mechanism than the first transport mechanism.

Although the apparatus, system, and method are illustrated and described herein as embodied in one or more specific examples, it is nevertheless not intended to be limited to the details shown, since various modifications and structural changes may be made therein without departing from the scope of the apparatus, system, and method and within the scope and range of equivalents of the claims. Accordingly, it is appropriate that the appended claims be construed broadly and in a manner consistent with the scope of the apparatus, system, and method, as set forth in the following claims.

The above description is intended by way of example only. Various modifications and structural changes may be made therein without departing from the scope of the concepts described herein and within the scope and range of equivalents of the claims.

What is claimed is:
1. A method comprising:
at a participant device, receiving media for a conference session, the media transmitted to the participant device using a first transport mechanism;
receiving a command containing a request from a user of a participant device in the conference session to playback a portion of the conference session;
determining whether packet loss has occurred for media received via the first transport mechanism at the participant device from a conference server; and
in response to determining that packet loss has not occurred, retrieving locally stored data for the portion of the conference session requested for playback.
2. The method of claim 1, further comprising:
in response to determining that packet loss has occurred, sending to the conference server a request to retransmit a recording of the portion of the conference session requested for playback; and
receiving data for the recording of the portion of the conference session transmitted from the conference server using a second transport mechanism separate from the first transport mechanism, wherein the second transport mechanism utilizes a second transport protocol with a reliability that is higher than a reliability of a first transport protocol utilized by the first transport mechanism.

3. A method comprising:
at a conference server, transmitting media for a conference session to a participant device using a first transport mechanism;
receiving a request from the participant device to playback media for a portion of the conference session, the portion beginning at a first time and ending at a second time within a specified interval;
in response to the received request, retransmitting the media for the portion of the conference session using a second transport mechanism separate from the first transport mechanism, wherein the second transport mechanism utilizes a second transport protocol with a reliability that is higher than a reliability of a first transport protocol utilized by the first transport mechanism; and
repairing a recording for the portion of the conference session based on one or more packets retransmitted by a presenting device to the conference server.

4. The method of claim 3, wherein the first transport protocol is a real-time transport protocol and the second transport protocol is a media streaming transport protocol.

5. The method of claim 4, wherein the second transport protocol is an adaptive bit rate streaming protocol.

6. The method of claim 3, wherein receiving the request from the participant device comprises receiving a request for a higher quality version of the portion of the conference session, and wherein retransmitting is responsive to receiving the request for the higher quality version of the portion of the conference session.

7. The method of claim 3, further comprising:
receiving, from the presenting device, transmissions of media associated with the conference session;
monitoring the received transmissions to determine whether any packet loss has occurred during the portion of the conference session; and
in response to detecting that packet loss has occurred during the portion of the conference session, sending a request to the presenting device to retransmit the one or more packets for the portion of the conference session.

8. The method of claim 7, wherein sending the request to the presenting device comprises sending the request to cause the presenting device to retransmit the one or more packets for the portion using the second transport mechanism.

9. The method of claim 7, wherein detecting further comprises detecting that packet loss has occurred based on detecting a series of packets having non-sequential sequence numbers.

10. An apparatus comprising:
a network interface unit to send and receive media for a conference session over a network; and
a processor coupled to the network interface unit, to:
select a first transport mechanism for transmission of media for the conference session to a participant device;
receive a request from the participant device to playback media for a portion of the conference session, the portion beginning at a first time and ending at a second time within a specified interval;
select a second transport mechanism separate from the first transport mechanism, in response to the received request, for retransmission of media for the portion of the conference session, wherein the second transport mechanism utilizes a second transport protocol with a reliability that is higher than a reliability of a first transport protocol utilized by the first transport mechanism; and
repair a recording for the portion of the conference session based upon one or more packets retransmitted by a presenting device to the apparatus.

11. The apparatus of claim 10, wherein the first transport protocol is a real-time transport protocol and the second transport protocol is a media streaming transport protocol.

12. The apparatus of claim 11, wherein the second transport protocol is an adaptive bit rate streaming protocol.

13. The apparatus of claim 10, wherein the processor is further configured to:
receive a request from the participant device for a higher quality version of the portion of the conference session; and
retransmit, in response to receiving the request, the higher quality version of the portion of the conference session.

14. One or more non-transitory computer-readable storage media encoded with software comprising computer executable instructions and when the software is executed operable to:
cause media for a conference session to be transmitted to a participant device using a first transport mechanism;
receive a request from the participant device to playback media for a portion of the conference session, the portion beginning at a first time and ending at a second time within a specified interval;
cause media for the portion of the conference session to be retransmitted using a second transport mechanism separate from the first transport mechanism, in response to the received request, wherein the second transport mechanism utilizes a second transport protocol with a reliability that is higher than a reliability of a first transport protocol utilized by the first transport mechanism; and
repair a recording for the portion of the conference session based upon one or more packets retransmitted by a presenting device.

15. The non-transitory computer readable storage media of claim 14, wherein the first transport protocol is a real-time transport protocol and the second transport protocol is a media streaming transport protocol.

16. The non-transitory computer readable storage media of claim 14, further comprising instructions operable to receive a request for a higher quality version from the participant device of the portion of the conference session, and cause the higher quality version of the portion of the conference session to be retransmitted in response to receiving the request.

17. The non-transitory computer readable storage media of claim 14, further comprising instructions operable to detect that packet loss has occurred based on detecting a series of packets having non-sequential sequence numbers.

18. The method of claim 2, wherein the first transport protocol is a real-time transport protocol and the second transport protocol is a media streaming protocol.

19. The method of claim 1, further comprising:
buffering live content from the conference session while the portion of the conference session is being played back.

20. The method of claim 19, further comprising:
playing back the portion of the conference session in an accelerated manner.

21. The method of claim 20, wherein playing back the portion of the conference session includes skipping silent portions to accelerate and catch up to the live content.

* * * * *